United States Patent
Vandervort

(10) Patent No.: US 9,053,327 B2
(45) Date of Patent: Jun. 9, 2015

(54) METHOD AND SYSTEM FOR DISTRIBUTED CONTROL OF USER PRIVACY PREFERENCES

(71) Applicant: Xerox Corporation, Norwalk, CT (US)

(72) Inventor: David Russell Vandervort, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 248 days.

(21) Appl. No.: 13/770,385

(22) Filed: Feb. 19, 2013

(65) Prior Publication Data

US 2014/0237610 A1 Aug. 21, 2014

(51) Int. Cl.
G06F 21/60 (2013.01)

(52) U.S. Cl.
CPC ...................................... *G06F 21/60* (2013.01)

(58) Field of Classification Search
None
See application file for complete search history.

(56) References Cited

U.S. PATENT DOCUMENTS

| 8,225,376 | B2 | 7/2012 | Zuckerberg et al. |
| 8,234,688 | B2 | 7/2012 | Grandison et al. |
| 8,321,681 | B2 | 11/2012 | Tulchinsky et al. |
| 2002/0087472 | A1 | 7/2002 | Walter |
| 2009/0271209 | A1* | 10/2009 | Krishnamurthy et al. ........ 705/1 |
| 2010/0280965 | A1 | 11/2010 | Vesterinen et al. |
| 2012/0323794 | A1 | 12/2012 | Livshits |
| 2012/0331567 | A1* | 12/2012 | Shelton ........................... 726/28 |
| 2013/0305379 | A1* | 11/2013 | Udani ............................. 726/26 |

OTHER PUBLICATIONS

Anthonysamy et al., Collaborative Privacy Management for Third-Party Applications in Online Social Networks, ACM, Apr. 2012.*
Besmer et al., Social Applications: Exploring a More Secure Framework, SOUPS, 2009.*
Shehab et al., Beyond User-to-User Access Control for Online Social Networks, Springer-Verlag, 2008.*
Singh et al., xBook: Redesigning Privacy Control in Social Networking Platforms, USENIX, 2009.*
"Massachusetts provider settles HIPAA case for $1.5 million," HHS. gov, http://www.hhs.gov/news/press/2012pres/09/20120917a.html, printed Feb. 11, 2013, 1 page.

* cited by examiner

*Primary Examiner* — Minh Dinh
(74) *Attorney, Agent, or Firm* — Kermit D. Lopez; Luis M. Ortiz; Ortiz & Lopez, PLLC

(57) ABSTRACT

A system and method for managing user data preferences across multiple online sites and applications. A privacy center can be configured to include a user interface and an application programming interface (API). The user interface can be employed to set preferences for specific data types in order to handle the data types with a different level of privacy than other similar data type by the user. The API permits a plurality of sites to discover user's preferences, field names, and categories of data recognized by the site. The API adds new data fields to accommodate future changes in both technology and in legal restrictions on data usage. An address with respect to the API and the user interface along with a token can be entered when installing an application and the application downloads the preferences and applies them based on requirement.

20 Claims, 5 Drawing Sheets

METHOD AND SYSTEM FOR DISTRIBUTED CONTROL OF USER PRIVACY PREFERENCES

FIELD OF THE INVENTION

Embodiments are generally related to data-processing systems. Embodiments are also related to social network enabled marketing, business-to-business services, and business-to-consumer services such as managing. Embodiments are additionally related to the distributed control of user privacy preferences.

BACKGROUND

The World Wide Web (the "web") has transformed from a passive medium to an active medium where users take part in shaping the content they receive. One popular form of active content on the web is personalized content, wherein a provider employs certain characteristics of a particular user, such as their demographic or previous behaviors, to filter, select, or otherwise modify the content ultimately presented. This transition to active content raises serious concerns about privacy as arbitrary personal/private information may be required to enable personalized content, and a confluence of factors has made it difficult for users to control where this information ends up and how it is utilized.

One area of privacy concern is social media and increasingly related social media applications and web sites. Social media generally involves a large number of users who interact socially with one another via the Internet, and allows users to freely express and share opinions with other users via social networking applications. Social networking sites and mobile communication applications collect demographic information such as, for example, address, age and income; identifiers such as name, credit card number, social security number, email address, and photographs via a facial recognition software. In addition to these discrete data points, many applications collect information regarding user behavior, user support (or "like"), and user communication details. Such information is bought, sold, traded, aggregated, and analyzed for marketing and other purposes and also frequently leaked to unintended people and organizations.

As organizations, businesses, and companies expand services offerings through services, common issues of privacy are also gaining prominence. For example, many applications create a data analysis platform that can work with client's customer data and utilize social media type connections and reputation computations to facilitate business-to-business operations. The majority of prior art approaches for controlling user data privacy are complicated and confusing, and may even change with little or no warning. Such approaches do not monitor each site with respect to changes in their privacy policies and settings and do not make adjustments to each site and each setting on a case-by-case basis. Additionally, manual methods of maintaining privacy are time consuming and error prone. Unintended leakage of personal data to potentially unfriendly applications and users is therefore extremely difficult to prevent.

Based on the foregoing, it is believed that a need exists for an improved system and method for managing user privacy across multiple online sites and applications and sharing data smoothly while maintaining security, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved data-processing method and system.

It is another aspect of the disclosed embodiments to provide for improved methods and systems for social network enabled marketing, business-to-business services, and business-to-consumer services.

It is further aspect of the disclosed embodiments to provide for an improved method and system for managing user data across multiple online sites and applications and smoothly and securely sharing the data.

The aforementioned aspects and other objectives and advantages can now be achieved as described herein. A system and method for managing user data across multiple online sites and applications is disclosed herein. A privacy center can be configured to include a user interface and an API (Application Programming Interface). The user interface can be employed to set preferences for specific data types in order to handle the data types with a different level of privacy than other similar data type by the user. The API permits one or more "sites" to discover a user's preferences, field names, and categories of data recognized by the site. The API adds new data fields to accommodate future changes in both technology and in legal restrictions on data usage. An address with respect to the API and the user interface along with a token can be entered when installing an application (e.g., social application, mobile application, service site) and the application downloads the preferences and applies them based on a requirement. Such an approach can provide consistency while increasing privacy by reducing opportunities for leakage and enabling sites to determine an appropriate security control required to satisfy a customer requirement (or requirements).

The user interface can be presented as an integral component of a website and/or as part of a standalone system. The interface presents the user with a list of types of private data and possible privacy settings. The specific data types are not associated preferences. The data types can be connected to normalized data type names and a list of generic data type names can be maintained. The data types can be linked to specific implementations to permit communication with different types of sites and languages associated with the site. The user sets preferences for different categories of data usage such as, for example, personal data fields, behavioral data, user comments, photos and videos uploaded, and items shared with other users. Each category includes a screen or menu tab on the user interface for configuring requirements and different types of settings than another category.

The web-based API (e.g., REST or SOAP) allows the privacy preferences to be discoverable by other sites and applications via a number of different approaches. An "all preferences" service approach can return a list of key value pairs with each key being a field type name and a value being a privacy level the user set for that field. The field preference approach returns the privacy preference for the name of a data field (e.g., primary_email). The public fields approach returns a list of key value pairs for the given user in which the key is the field type name and the value is the actual data the user has designated for public consumption. The category preferences approach returns a list of key value pairs for the given category in which the key is the data type name and the value is the privacy level with regard to elements within the category.

The field names approach returns a list of key value pairs with each key being the name of a data field and the value being an array of aliases for that field. Optionally, a field name can be supplied and a single key-value pair that matches can be returned. An optional category name can restrict results to that particular category. The add field approach expects the field name. Other data that may be supplied include an alias that is known to be in the database.

Each API approach can be supplied with a unique user identifier. A token can be provided to each user either as a parameter or as part of the URL. The optional platform identifier (e.g., such as Wordpress, Contineo, etc.) can be provided so that the field name can be associated with that data type category to adapt to changing technologies and to accommodate changing needs of both businesses and users. The field name approach and the add field approach does not require the unique user identifier.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
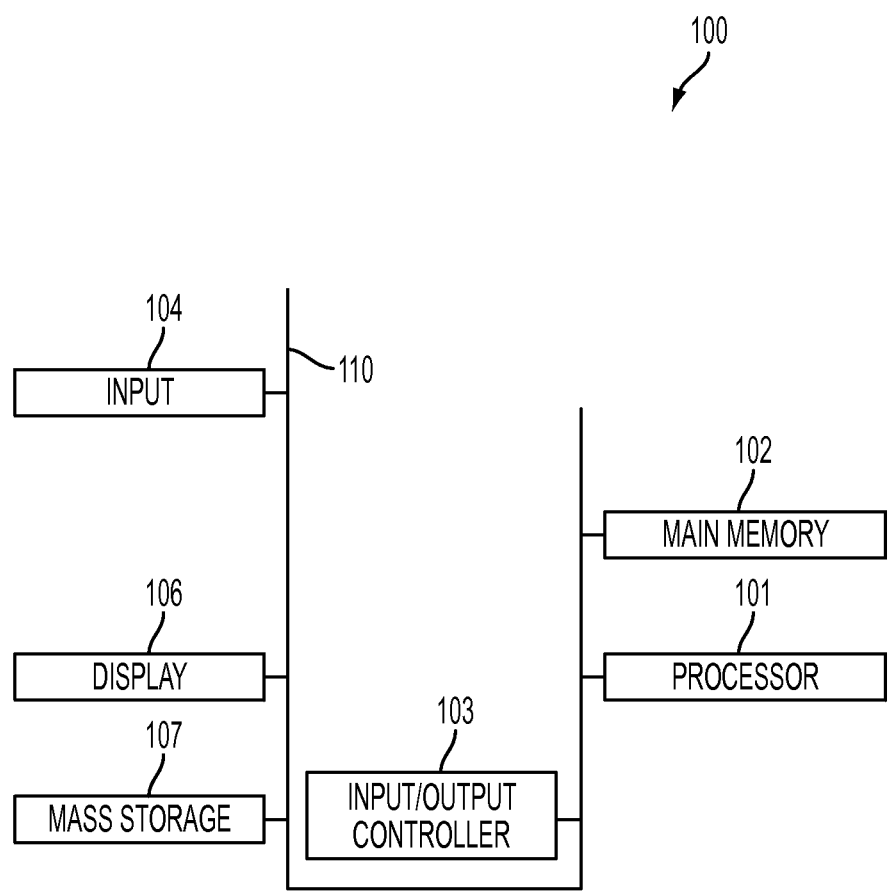
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
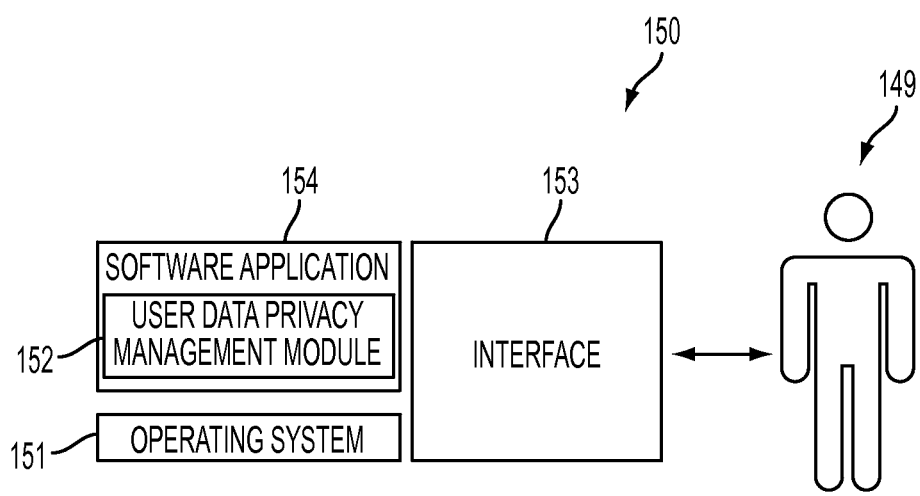
FIG. 2 illustrates a schematic view of a software system including a user data privacy management module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a system bus 110, a processor 101 (e.g., a microprocessor and/or other processing components), a main memory 102, an input/output controller 103, an input device 104 (e.g., a keyboard, pointing device, touchscreen interface, etc.), a display device 106, and mass storage 107 (e.g., a hard disk). In some embodiments, for example, a USB peripheral connection (not shown in FIG. 1) and/or other hardward components may also be in electrical communication with the system bus 110 and components thereof. As illustrated, the various components of data-processing system 100 can communicate electronically through the system bus 110 or a similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), also serves to display results, whereupon the user 149 may supply additional inputs or terminate the session. In an embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 154 can include a user data privacy management module 152 for managing user data. Software application 154, on the other hand, can include instructions such as the various operations described herein with respect to the various components and modules described herein such as, for example, the method 500 depicted in FIG. 5.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 3:
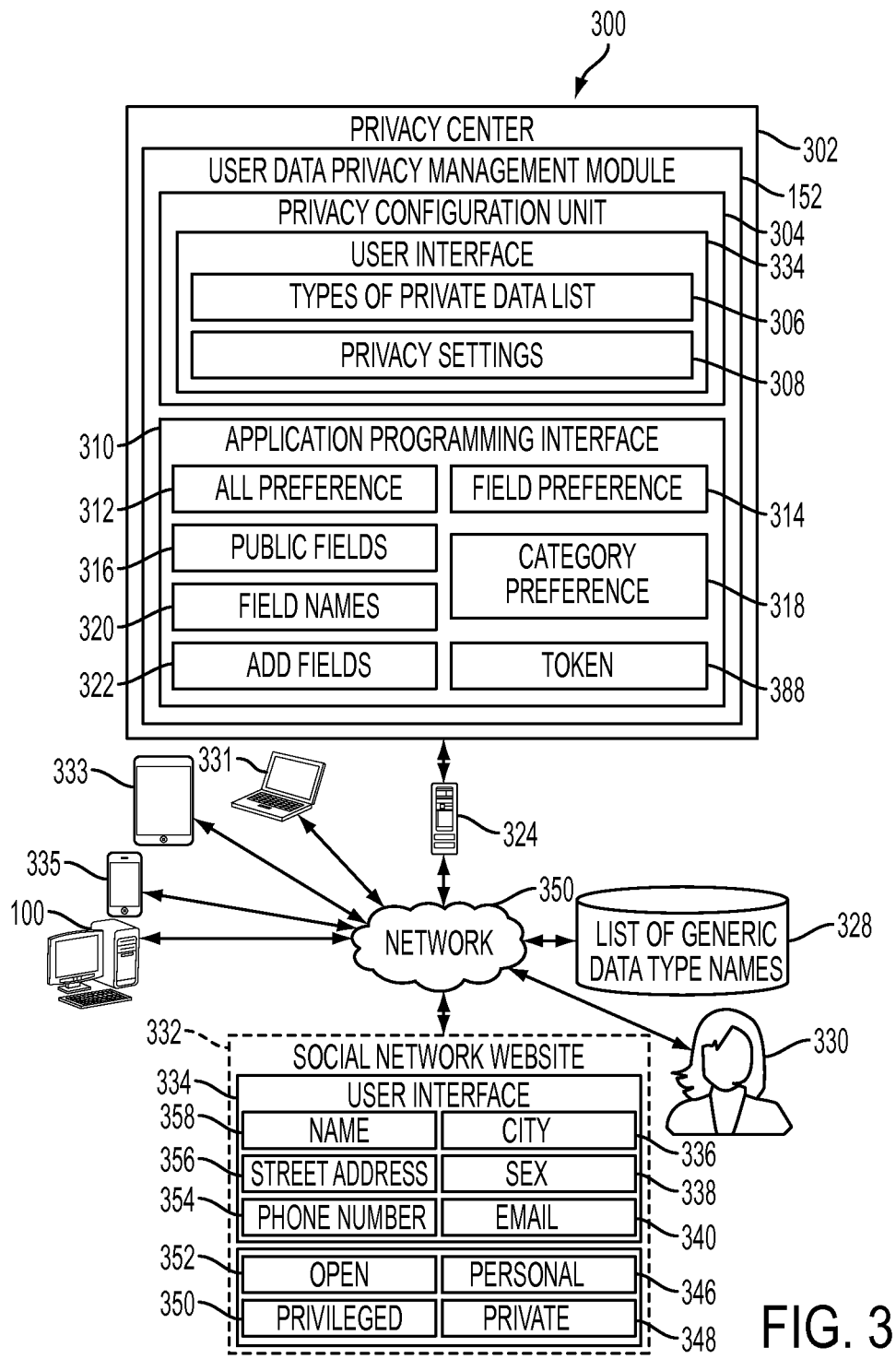
FIG. 3 illustrates a block diagram of a user data privacy management system, in accordance with the disclosed embodiments.

FIG. 3 illustrates a block diagram of a user data privacy management system 300 for managing user data, in accordance with the disclosed embodiments. Note that in FIGS. 1-5, identical or similar blocks are generally indicated by identical reference numerals. The system 300 generally can include a server 324 configured with a privacy center 302 connected to a network 350. The privacy center 302 can be configured to include a privacy configuration unit 304 and an application programming interface 310. The privacy configuration unit 304 configures a user interface 334 on an application 332 (e.g., social application, mobile application, service site, etc.) by entering an address with respect to the application programming interface 310 and the user interface 334 along with a token 388 when installing the application 332 and the application 332 downloads the preferences and applies them based on a requirement (or requirements).

Other devices that may communicate with network 350 and hence the server 324, the privacy center 302, and social network website 332 include, for example, a laptop computer 331, a pad computing device 333, a Smartphone 335, and so forth. Note that although a single application or site 332 is depicted in FIG. 3, it can be appreciated that multiple sites can communicate and interact with the privacy center 300 via the network 350 (e.g., the Internet) along with client devices such as devices 331, 333, 335, 100, etc.

Note that the network 350 may employ any network topology, transmission medium, or network protocol. The network 350 may include connections such as wire, wireless communication links, or fiber optic cables. Network 350 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The user interface 334 can be configured to set preferences for specific data types for special handling with a different level of privacy than other data of similar type by the user 330. For example, the user 330 might enter their work email address and associate it with a generic email type and specify it as having public (or open) visibility, while all other emails are set to private. In this case, email fields in general can still retain the user 330 specified default setting (e.g., private) while instances of the work email address can be automatically set to public. The data types includes personal data fields such as name, address and phone number, behavioral data such as pages viewed, items bought, and connections with other users (friend links), comments that people make, photos and videos uploaded, and items "shared" with other users.

Figure 4:
FIG. 4 illustrates a graphical user interface for managing user data, in accordance with the disclosed embodiments.

The user interface 334 can be presented as an integral component of a website or as a part of a standalone system. The interface 334 presents the user 330 with a list of types of private data 306 and possible privacy settings 308. For example, as shown in FIG. 4, the user interface 334 includes common data fields such as name 358, city 336, street address 356, email 340, sex 338, and phone number 354. In addition, specific choices can made available to restrict access to this type of data. Note that the example shown in FIG. 4 is oriented towards the data related to a particular user 330. The user interface 334 may include additional fields and categories related to company information and the customer data that can be uploaded to the site for analysis. The data can be set to open 352, personal 346, privileged 350, and private 348.

The specific data is not associated with the preferences. For example, when the user 330 sets the visibility of email to privileged 350, the setting applies to any and all email addresses (with exceptions noted below), not to any specific one. The data can be easily extended to types not shown such as newsfeed and connections (or friends). The privacy configuration unit 304 connects known data types to normalized data type names. For example, if a site contains a field for "primary email" and another has a field named "email 1", the user 330 can set a visibility preference for "email" in order for the privacy center 302 to apply it to both sites. The privacy configuration unit 304 may maintain a list of generic data type names on a database 328 and also link data types to specific implementations. For example, Wordpress blogs might refer to a login and an email address, while all MediaWiki wikis might instead use user_email and user_name. The privacy configuration unit 304 permits communication with different types of sites to be implemented in the language those sites understand.

The user interface 334 provides users options for setting the preferences for the way these other categories of data may be used, just as easily as they can set the privacy preferences for the personal data. New categories can thus easily be created to accommodate future changes in technology, in business needs, and in legal restrictions on data usage. For example, each category may have its own screen or menu tab on the privacy center 302 for working with its requirements and even slightly different types of settings 308 than another category. For example, in the personal data category, there can be settings for whether data is allowed to be shared with friends and friends of friends, whereas in the "behavioral" category it can be more appropriate to set a preference for whether data can be sold to third parties.

The API 310 can be configured to permit a number of sites to discover user's preferences, field names, and categories of data recognized by the site. The web-based API 310 (e.g., REST or SOAP) includes a number of approaches. An all_preference approach 312 returns a list of key value pairs with each key being a field type name and the value being the privacy level the user 330 has set for that field. A field_preference approach 314 returns the privacy preference for the given name of a data field (e.g., primary_email). A public_fields 316 returns a list (which may be empty) of key value pairs for the given user 330 in which the key is the field type name and the value is the actual data the user 330 has designated for public consumption (such as a work email address). A category_preferences 318 returns a list of key value pairs in which the key is the data type name and the value is the privacy level with regard to elements within the category for given category name (for example, one of behavioral or "posts and uploads").

Each method can be supplied with a unique user identifier. Each user 330 can be provided with the token 388 that supplied either as a parameter or as a part of the URL. Each method also accepts an optional platform identifier (such as Wordpress or Contineo). The site responds by using field names that the platform understands, if known. A field_names approach and an add_field approach does not require a user identifier. The field_names approach 320 returns a list of key value pairs with each key being the name of a data field (such as "email") and the value being an array of aliases for that field ("primary_email", "email_address", "email 1", etc.). Optionally, a field name can be supplied and the system can return a single key-value pair (as described above) that matches.

An optional category name can restrict results to that particular category. The add_field approach 322 expects a field name. Other data that may be supplied include an alias that is known to be in the database. A platform identifier (such as Wordpress or Contineo) may also be supplied, which can permit the site to associate that field name with that platform. An optional category may also be supplied so the field name can be associated with that data type category.

Figure 5:
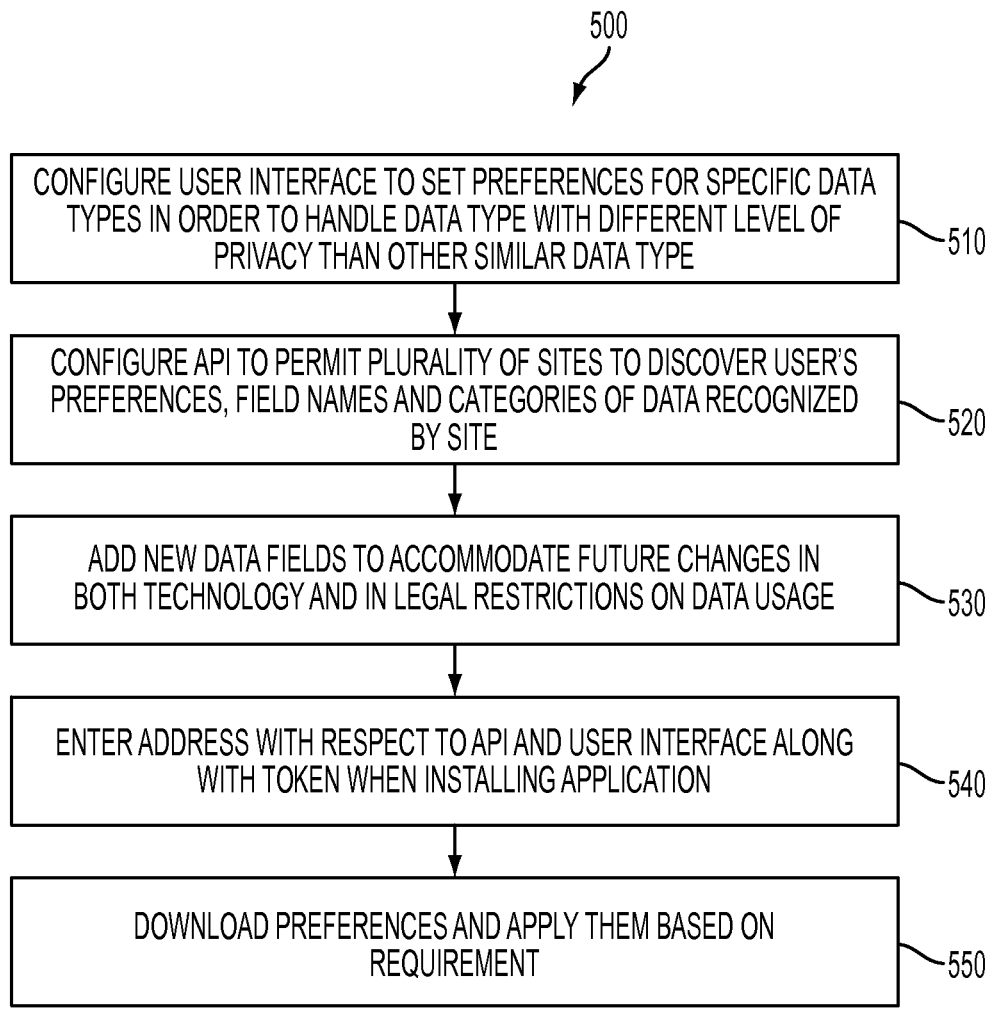
FIG. 5 illustrates a high level flow chart of operations illustrating logical operational steps of a method for managing user data across multiple online sites and applications, in accordance with the disclosed embodiments.

FIG. 5 illustrates a high level flow chart of operations illustrating logical operational steps of a method 500 for managing user data across multiple online sites and applications, in accordance with the disclosed embodiments. It can be appreciated that the logical operational steps shown in FIG. 5 can be implemented or provided via, for example, a module such as module 154 shown in FIG. 2 and can be processed via a processor such as, for example, the processor 101 shown in FIG. 1.

Initially, as indicated at block 510, the user interface 334 can be configured to set preferences for specific data types for special handling with a different level of privacy than other data of similar type by the user 330. The API 310 can be configured to permit a number of sites to discover user's preferences, field names, and categories of data recognized by the site, as shown at block 520. The API 310 adds new data fields to accommodate future changes in both technology and in legal restrictions on data usage, as illustrated at block 530.

The address with respect to the API 310 and the user interface 334 along with the token 388 can be entered when installing the application (e.g., social application, mobile application, service site) and the application downloads the preferences and applies them based on a requirement (or requirements), as indicated at blocks 540 and 550. Such an approach provides consistency and increases privacy by reducing opportunities for leakage while also enabling sites to determine the appropriate security controls needed to satisfy customer needs.

The interface 334 and API 310 combine to form a powerful platform for easing the burden on both users and businesses of sharing information safely and comfortably. Entering a single URL rather than configuring preferences for each of possibly dozens of applications provides consistency and improves ease of use. The personal data collected can expand to be more like the extensive collection and aggregation prevalent on the web. For example, social applications such as Facebook applications can also make use of the interface 334 to discover information users are willing to share, rather than requiring them to make those decisions again every time they consider using some new game or other application.

The privacy preferences can be configured with the services site (such as Contineo Crowd Sourcing, Scale Insight or Social Media Analytics) by entering the address of the privacy center 302. The system 300 share and respect privacy settings 308 increase customer ease and satisfaction across the board. A sample code can also model the user interface 334 of the privacy center 302. This type of code is especially useful for sites built on highly configurable and widely used technologies such as Drupal, Wordpress, and Mediawiki. Fully developed plug-ins can permit services or business partners using a wide variety of technologies to be fully integrated into, for example, a privacy centers ecosystem.

The system 300 improves the interaction between people and the web sites and applications with which they interact. The system 300 invites privacy settings 308 on various fields, without inviting for data itself. This increases privacy by reducing opportunities for leakage while also enabling sites to determine the appropriate security controls needed to satisfy customer needs. System 300 also promotes the abstraction of private data types and the movement of categories away from platform specific naming conventions and even away from specific pieces of data.

The system 300 can be created on an ad hoc basis by each site and application for its own specific needs. The ability to add new fields and new aliases for old fields reinforces the abstraction and permits it to adapt to changing platforms, services, and technologies. The use of a web API 310 allows discovery of privacy preferences without leakage of the data itself. This permits a level of interaction between sites and applications such as services sites (e.g., also referred to simply as "services") that ease both the burden on users of monitoring their privacy while increasing increases their confidence in the services they use. The system 300 sets a level of protection for user private data and discovers those preferences, thereby improving the ability of services to protect a customer's information. The system 300 improves the ability of different sites to share users and provide such users with a seamless, comfortable, and secure experience for related services such as a "services" marketplace.

Based on the foregoing, it can be appreciated that a number of embodiments, preferred and alternative, are disclosed herein. For example, in one embodiment, a method can be implemented for managing data preferences. Such a method can include, for example, the steps or logical operations of designating a preference for a number of data types in order to handle the data types with a different level of privacy than other similar data types, assembling an application programming interface to permit one or more sites to discover, for example, a user preference, a field name, and a category of data recognizable by sites, and adding a new data field (and/or data thereof) to accommodate changes with respect to a technology and a legal restriction on data usage to provide consistency and increase privacy by reducing an opportunity for leakage of privacy data thereof.

In another embodiment, steps or logical operations can be implemented for entering an address with respect to the application programming interface and a user interface in association with a token when installing an application, and downloading and applying the preference with respect to the application based on a requirement (or requirements). In another embodiment a step or logical operation can be implemented for configuring the user interface as an integral component of a website and/or as a part of a standalone system.

In still other embodiments, steps or logical operations can be implemented for presenting a list of private data types and possible privacy settings via the user interface to thereafter connect the types to a normalized data type name, and maintaining a list of generic data type names and linking the data types to specific implementations to permit communication with different types of sites and languages associated with the site.

In other embodiments, the aforementioned specific data type is not associated with the preference. In some embodiments, the data types can be, for example, a personal data field, a behavioral data, a user comment, an uploaded photograph and video, or a shared item. In still other embodiments, a step or logical operation can be implemented for establishing a privacy preference discoverable by one or more sites and/or applications utilizing different approaches by the application programming interface.

In other embodiments, the aforementioned approaches can be, for example, an all preference approach that returns a list of key value pairs, with each key being a field type name and a value being a privacy level set for the field, a field preference approach that returns a privacy preference for name of a data field, or a public field approach that returns the list of key value pairs in which the key is the field type name and the value is an actual data that has been designated for a public consumption.

In yet another embodiment, a system for managing data preferences can be implemented. Such a system can include, for example, a processor, a data bus coupled to the processor, and a computer-usable medium embodying computer program code, the computer-usable medium being coupled to the data bus. Such computer program code can include instructions executable by the processor and configured, for example, for designating a preference for a number of data types in order to handle the data types with a different level of privacy than other similar data types; assembling an application programming interface to permit one or more sites to discover at least a user preference, a field name, and a category of data recognizable by the sites; and adding new data field to accommodate changes with respect to a technology and a legal restriction on data usage to provide consistency and increase privacy by reducing an opportunity for leakage of privacy data thereof.

In still another embodiment, such instructions can be further configured for entering an address with respect to the application programming interface and a user interface in association with a token when installing an application, and downloading and applying the preference with respect to the application based on a requirement (or requirements). Note that the aforementioned user interface can be configured in some embodiments as an integral component of a website and/or as a part of a standalone system.

In still other embodiments, such instructions can be further configured for presenting a list of private data types and possible privacy settings via the user interface to thereafter connect the data types to a normalized data type name, and maintaining a list of generic data type names and linking the data types to specific implementations to permit communication with different types of sites and languages associated with the site. In still other embodiments, such instructions can be further configure for establishing a privacy preference discoverable by one or more sites and applications utilizing a variety of approaches by the application programming interface.

In still another embodiment, a processor-readable medium storing computer code representing instructions to cause a process for managing data preferences can be provided. Such computer code can include code to, for example, designate a preference for one or more data types in order to handle the data types with a different level of privacy than other similar data types; assemble an application programming interface to permit one or more sites to discover at least a user preference, a field name, and a category of data recognizable by the sites; and add new data field to accommodate changes with respect to a technology and a legal restriction on data usage to provide consistency and increase privacy by reducing an opportunity for leakage of privacy data thereof.

In other embodiments, such code can include code to enter an address with respect to the application programming interface and a user interface in association with a token when installing an application, and download and apply the preference with respect to the application based on a requirement (or requirements).

In another embodiment, such code can include code to present a list of private data types and possible privacy settings via the user interface to thereafter connect the data types to a normalized data type name, and maintain a list of generic data type names and linking the data types to specific implementations to permit communication with different types of sites and languages associated with the site.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for managing data preferences, said method comprising:
designating via a processor a preference for a plurality of data types in order to handle said plurality of data types with a different level of privacy than other similar data types;
assembling via a processor an application programming interface to permit a plurality of sites to discover at least a user preference, a field name, and a category of data recognizable by said plurality of sites;
adding via a processor at least one new data field to accommodate changes with respect to a technology and a legal restriction on data usage to provide consistency and increase privacy by reducing an opportunity for leakage of privacy data thereof;
entering via a processor an address with respect to said application programming interface and a user interface in association with a token when installing an application; and
downloading and applying via a processor said preference with respect to said application programming interface based on requirement.

2. The method of claim 1 further comprising configuring said user interface as an integral component of a website.

3. The method of claim 1 further comprising configuring said user interface as an integral component of a website and/or as a part of a standalone system.

4. The method of claim 1 further comprising:
presenting via a processor a list of private data types and possible privacy settings via said user interface to thereafter connect said plurality of data types to a normalized data type name; and
maintaining via a processor a list of generic data type names and linking said plurality of data types to specific implementations to permit communication with different types of sites and languages associated with said site.

5. The method of claim 4 wherein said specific data type is not associated with said preference.

6. The method of claim 4 wherein said plurality of data types comprises at least one of all the following data types: a personal data field; a behavioral data; a user comment; an uploaded photograph and video; or a shared item.

7. The method of claim 1 further comprising establishing via a processor a privacy preference discoverable by a plurality of sites and applications utilizing a plurality of approaches by said application programming interface.

8. The method of claim 7 wherein said plurality of approaches further comprises at least one of the following:
an all preference approach that returns a list of key value pairs, with each key being a field type name and a value being a privacy level set for said field;
a field preference approach that returns a privacy preference for name of a data field; or
a public field approach that returns said list of key value pairs in which said key is said field type name and said value is an actual data that has been designated for a public consumption.

9. A system for managing data preferences, said system comprising:
a processor;
a data bus coupled to said processor; and
a computer-usable medium embodying computer program code, said computer-usable medium being coupled to said data bus, said computer program code comprising instructions executable by said processor and configured for:
designating a preference for a plurality of data types in order to handle said plurality of data types with a different level of privacy than other similar data types;
assembling an application programming interface to perm plurality of sites to discover at least a user preference, a field name, and a category of data recognizable by said plurality of sites;
adding at least one new data field to accommodate changes with respect to a technology and a legal restriction on data usage to provide consistency and increase privacy by reducing an opportunity for leakage of privacy data thereof;
entering an address with respect to said application programming interface and a user interface in association with a token when installing an application; and
downloading and applying said preference with respect to said application programming interface based on requirement.

10. The system of claim 9 wherein said user interface is configured as an integral component of a website.

11. The system of claim 9 wherein said user interface is configured as an integral component of a website and/or as a part of a standalone system.

12. The system of claim 9 wherein said instructions are further configured for:
presenting a list of private data types and possible privacy settings via said user interface to thereafter connect said plurality of data types to a normalized data type name; and
maintaining a list of generic data type names and linking said plurality of data types to specific implementations to permit communication with different types of sites and languages associated with said site.

13. The system of claim 12 wherein said specific data type is not associated with said preference.

14. The system of claim 12 wherein said plurality of data types comprises at least one of all the following data types: a personal data field; a behavioral data; a user comment; an uploaded photograph and video; or a shared item.

15. The system of claim 9 wherein said instructions are further configured for establishing a privacy preference discoverable by a plurality of sites and applications utilizing a plurality of approaches by said application programming interface.

16. The system of claim 15 wherein said plurality of approaches further comprises at least one of the following:
   an all preference approach that returns a list of key value pairs, with each key being a field type name and a value being a privacy level set for said field;
   a field preference approach that returns a privacy preference for name of a data field; or
   a public field approach that returns said list of key value pairs in which said key is said field type name and said value is an actual data that has been designated for a public consumption.

17. A non-transitory processor-readable medium storing computer code representing instructions to cause a process for managing data preferences, said computer code comprising code to:
   designate a preference for a plurality of data types in order to handle said plurality of data types with a different level of privacy than other similar data types;
   assemble an application programming interface to permit a plurality of sites to discover at least a user preference, a field name, and a category of data recognizable by said plurality of sites;
   add at least one new data field to accommodate changes with respect to a technology and a legal restriction on data usage to provide consistency and increase privacy by reducing an opportunity for leakage of privacy data thereof;
   enter an address with respect to said application programming interface and a user interface in association with a token when installing an application; and
   download and apply said preference with respect to said application programming interface based on requirement.

18. The non-transitory processor-readable medium of claim 17 wherein said user interface is configured as an integral component of a website and/or as a tart of a standalone system.

19. The non-transitory processor-readable medium of claim 17 wherein said code further comprises code to:
   present a list of private data types and possible privacy settings via said user interface to thereafter connect said plurality of data types to a normalized data type name; and
   maintain a list of generic data type names and linking said plurality of data types to specific implementations to permit communication with different types of sites and languages associated with said site.

20. The non-transitory processor-readable medium of claim 17 wherein said plurality of data types comprises at least one of all the following data types: a personal data field; a behavioral data; a user comment; an uploaded photograph and video; or a shared item.

* * * * *